United States Patent
Zhao et al.

(10) Patent No.: US 10,807,318 B2
(45) Date of Patent: Oct. 20, 2020

(54) METHOD FOR MANUFACTURING INTEGRATED HYDRAULIC ACCUMULATOR BLADDER

(71) Applicant: SHIJIAZHUANG SIMKER TECHNOLOGY CO., LTD, Shijiazhuang (CN)

(72) Inventors: Huijiang Zhao, Shijiazhuang (CN); Tengyu Zhao, Shijiazhuang (CN)

( * ) Notice: Subject to any disclaimer, the term of this patent is extended or adjusted under 35 U.S.C. 154(b) by 147 days.

(21) Appl. No.: 16/006,842

(22) Filed: Jun. 13, 2018

(65) Prior Publication Data

US 2018/0290392 A1    Oct. 11, 2018

Related U.S. Application Data

(63) Continuation of application No. PCT/CN2016/083447, filed on May 26, 2016.

(51) Int. Cl.

| B29C 65/00 | (2006.01) |
|---|---|
| B29D 22/02 | (2006.01) |
| B29C 35/02 | (2006.01) |
| F15B 1/08 | (2006.01) |
| F15B 1/10 | (2006.01) |

(52) U.S. Cl.
CPC ........ *B29C 66/81455* (2013.01); *B29C 66/71* (2013.01); *B29D 22/02* (2013.01); *F15B 1/08* (2013.01); *F15B 1/10* (2013.01); *B29C 35/02* (2013.01); *F15B 2201/205* (2013.01); *F15B 2201/3152* (2013.01); *F15B 2201/3155* (2013.01); *F15B 2201/61* (2013.01)

(58) Field of Classification Search
None
See application file for complete search history.

(56) References Cited

U.S. PATENT DOCUMENTS

| 5,024,715 A | 6/1991 | Trussler | |
|---|---|---|---|
| 2002/0015746 A1* | 2/2002 | Mitamura | B29C 35/0272 425/50 |
| 2004/0247717 A1* | 12/2004 | Okada | B29C 35/0294 425/40 |

FOREIGN PATENT DOCUMENTS

| CN | 101284405 A | * 10/2008 | |
|---|---|---|---|
| CN | 101284405 A | 10/2008 | |
| GB | 1169023 A | * 10/1969 | B29C 63/24 |

OTHER PUBLICATIONS

Espacenet machine translation of CN-101284405-A, obtained Dec. 10, 2019.*

* cited by examiner

*Primary Examiner* — Peter L Vajda
*Assistant Examiner* — Paul Spiel
(74) *Attorney, Agent, or Firm* — Erson IP (Nelson IP)

(57) ABSTRACT

A method for manufacturing a hydraulic accumulator bladder includes the following steps: bonding a rubber sheet to the gas-filled air bladder to form a bladder blank; placing the bladder blank in a vulcanization device for vulcanization to form an initial bladder product; and releasing the gas in the gas-filled air bladder of the initial bladder product, taking the air bladder out, and naturally cooling the initial bladder product to a room temperature to form a finished bladder product. The bladder manufactured by the manufacturing method is integrally formed by one-step vulcanization, and has the advantages of uniform wall thickness, smooth inner and outer surfaces, long fatigue lifetime, a simplified process, high quality and good stability.

1 Claim, 1 Drawing Sheet

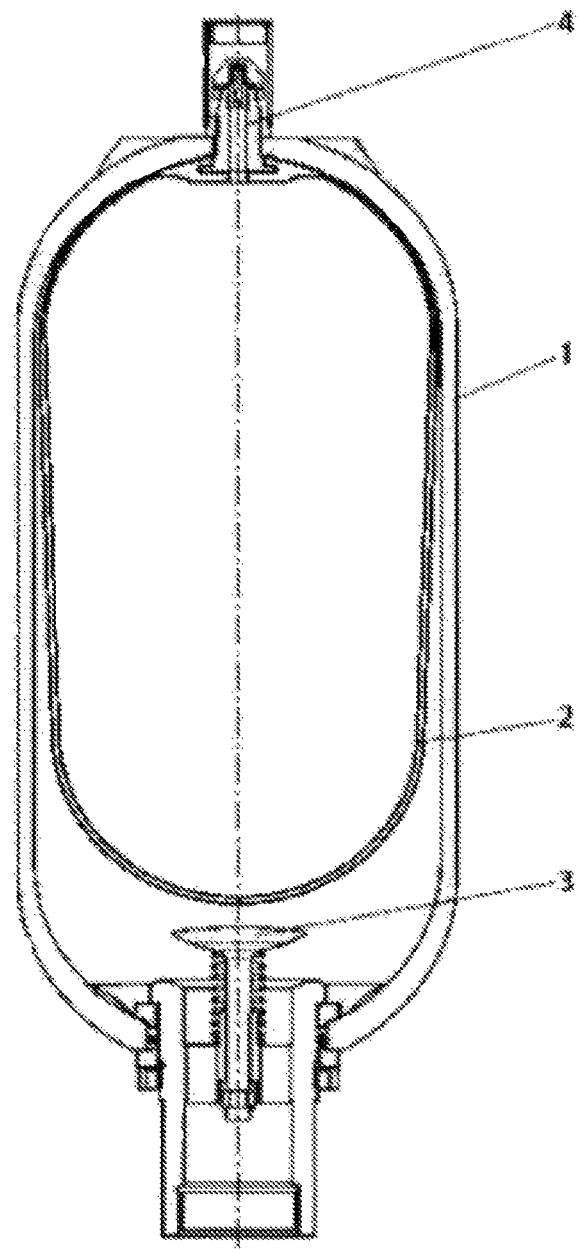
(Prior Art)

US 10,807,318 B2

METHOD FOR MANUFACTURING INTEGRATED HYDRAULIC ACCUMULATOR BLADDER

CROSS-REFERENCE TO RELATED APPLICATIONS

This application is a continuation of International Patent Application No. PCT/CN2016/083447 with a filing date of May 26, 2016, designating the United States, now pending. The content of the aforementioned applications, including any intervening amendments thereto, are incorporated herein by reference.

TECHNICAL FIELD

The present invention relates to a method for manufacturing an integrated hydraulic accumulator bladder and belongs to the technical field of bladder manufacturing.

BACKGROUND OF THE PRESENT INVENTION

An accumulator bladder is an important part of a bladder type accumulator. The accumulator bladder in the prior art is made of rubber and is flexible for accumulating a compressed inert gas. Nitrogen with a pressure will be injected inside the bladder, and hydraulic oil will be filled outside the bladder, as such, the bladder will be deformed with the extrusion of the hydraulic oil, thereby compressing the nitrogen to accumulate energy, and otherwise to release the energy.

As shown in FIG. 1, an accumulator includes a pressure-proof housing, an elastic bladder, an inflation valve, a poppet valve, an oil inlet and the like. Critical elements of the accumulator are the bladder and the housing, the bladder is particularly important, and the bladder is a key factor in determining the quality and the service life. The accumulator bladder mainly has four functions of accumulating the energy, absorbing hydraulic shock, eliminating pulsation and recovering the energy.

A volume ratio of the rubber bladder in the prior art before and after pressurization is less than 2, and energy in a pulsation pressure and a flow cannot be absorbed in a large amount. Therefore, the rubber bladder in the prior art is insufficient in accumulated energy and poor in thermal expansion compensation performance, and cannot absorb the hydraulic impact and eliminate the pulsation as well as reduce the noise, resulting in following defects:

1, the change in volume is relatively small, so that the pressure pulsation cannot be effectively absorbed;

2, the function of mitigating a shock pressure is insufficient; and 3, the service life is short.

Reasons for the above defects are as follows: the accumulator bladder of the prior art is formed with an internal core mold of the bladder in volume and shape, resulting in the concentration of an internal stress during formation; the amount of change in volume of the bladder after vulcanization is small and the pressure pulsation cannot be effectively absorbed; by means of separated vulcanization after the formation of the internal core mould, that is, a separated type process, some methods, which are realized by bonding and then vulcanizing although being called integrated process vulcanization, still belong to a separated type technology and cannot solve the above technical defects.

SUMMARY OF PRESENT INVENTION

In order to overcome the shortcomings in the prior art, an objective of the present invention is to provide a manufacturing method of an integrated hydraulic accumulator bladder. The bladder manufactured by the method is integrally formed by one-step vulcanization, in this way, a process is simplified.

In order to achieve the above objective of the present invention, the present invention provides a method for manufacturing a hydraulic accumulator bladder, characterized by including: bonding a rubber sheet to the gas-filled air bladder to form a bladder blank.

The method further includes: placing the bladder blank in a vulcanization device for vulcanization to form an initial bladder product.

The method further includes: after the initial bladder product is cooled, releasing the gas in the gas-filled air bladder and taking the air bladder out to obtain a finished bladder product.

Compared with the prior art, the bladder manufactured by the method provided in this disclosure is integrally formed by one-step vulcanization, and has the advantages of uniform wall thickness, smooth inner and outer surfaces, long fatigue lifetime, a simplified process, high product quality, and good stability. The bladder is excellent in gas sealing performance, may effectively prevent the gas in a bladder body from leaking, and can eliminate a peak-valley value of the pressure fluctuation.

DESCRIPTION OF THE DRAWINGS

FIG. 1 is a schematic diagram showing a structure of an accumulator in the prior art.

In FIG. 1, 1: accumulator; 2: bladder; 3: oil valve; and 4: gas valve.

DETAILED DESCRIPTION OF PREFERRED EMBODIMENTS

The present invention will be described in detail with reference to examples.

The present invention provides a method for manufacturing a hydraulic accumulator bladder, which includes: bonding a rubber sheet to the gas-filled air bladder to form a bladder blank, more specifically, preheating the rubber sheet in a rubber baking room of 60 DEG C. to 70 DEG C. for 3 to 8 hours, preferably, 4 hours, and then winding the rubber sheet around the gas-filled air bladder for multiple layers to form an initial bladder product.

The method for manufacturing the hydraulic accumulator bladder further includes: placing the bladder blank in a vulcanization device for vulcanization to form an initial bladder product.

The method for manufacturing the hydraulic accumulator bladder further includes: releasing the gas in the gas-filled air bladder of the initial bladder product, taking the air bladder out, and naturally cooling the vulcanized initial product to a room temperature to form a finished bladder product.

The present invention provides a sizing material for a hydraulic accumulator bladder, which is prepared from at least the following raw materials in parts by weight: 50 to 90 parts by weight of nitrile butadiene rubber, 10 to 50 parts by weight of polyvinyl chloride plastic, 3 to 5 parts by weight of zinc oxide, 1 to 1.5 parts by weight of stearic acid, 0.5 to 1 part by weight of paraffin, 2.5 to 3 parts by weight of an antioxidant, 40 to 42.5 parts by weight of N220 carbon black, 7.5 to 10 parts by weight of N774 carbon black, 20 to 22 parts by weight of a plasticizer, 1.5 to 1.8 parts by weight of a S-80 vulcanizing agent, and 0.85 to 1.2 parts by weight of a DM vulcanizing agent.

EXAMPLE 1

An example 1 of the present invention provides a sizing material for a hydraulic accumulator bladder, which is prepared from at least the following raw materials in parts by weight: 70 parts by weight of nitrile butadiene rubber, 30 parts by weight of polyvinyl chloride plastic, 3 parts by weight of zinc oxide, 1 part by weight of stearic acid, 1 part by weight of paraffin, 2.5 parts by weight of an antioxidant, 40 parts by weight of N220 carbon black, 7.5 parts by weight of N774 carbon black, 20 parts by weight of a plasticizer, 1.5 parts by weight of a S-80 vulcanizing agent, and 0.85 part by weight of a DM vulcanizing agent.

The sizing material for the hydraulic accumulator bladder provided by the example 1 of the present invention is prepared by adopting the following steps:

step 1, mixing the nitrile butadiene rubber, the polyvinyl chloride plastic, the zinc oxide, the stearic acid, the paraffin and the 4010NA antioxidant which are weighed in parts by weight in an internal mixer, where the mixing temperature is controlled at 80 DEG C., the time is about 6 min and the nitrile butadiene rubber is processed until the Mooney viscosity is preferably between 55 and 60;

step 2, adding ⅔ of the N220 carbon black weighed in parts by weight and ½ of the N774 carbon black weighed in parts by weight in the above sizing material for mixing, where the mixing temperature is controlled at 80 DEG C. and the time is about 6 min;

step 3, adding ⅓ of the N220 carbon black weighed in parts by weight, ½ of the N774 carbon black weighed in parts by weight and the DOA plasticizer weighed in parts by weight for mixing to obtain a master batch, where the mixing temperature is controlled at 80 DEG C. and the time is about 4 min;

step 4, filtering the master batch in a rubber filter, then placing it in an open mill, and then adding the S-80 vulcanizing agent and the DM vulcanizing agent for mixing to obtain a rubber compound;

step 5, blending the rubber compound on a hot mill for improving the mixing uniformity of the sizing material and further increasing the plasticity; and step 6, placing the rubber compound in a calender to calender a rubber sheet, then placing it in an extruder to extrude a rubber sheet, and then discharging the rubber sheet and cooling it.

EXAMPLE 2

An example 2 of the present invention provides a sizing material for a hydraulic accumulator bladder, which is prepared from at least the following raw materials in parts by weight: 90 parts by weight of nitrile butadiene rubber, 50 parts by weight of polyvinyl chloride plastic, 5 parts by weight of zinc oxide, 1.5 parts by weight of stearic acid, 0.5 part by weight of paraffin, 3 parts by weight of an antioxidant, 40 parts by weight of N220 carbon black, 7.5 parts by weight of N774 carbon black, 22 parts by weight of a plasticizer, 1.8 parts by weight of a S-80 vulcanizing agent, and 1.2 parts by weight of a DM vulcanizing agent.

The sizing material for the hydraulic accumulator bladder provided by the example 2 of the present invention is prepared by adopting the following steps:

step 1, mixing the nitrile butadiene rubber, the polyvinyl chloride plastic, the zinc oxide, the stearic acid, the paraffin and the 4010NA antioxidant which are weighed in parts by weight in an internal mixer, where the mixing temperature is controlled at 83 DEG C., the time is about 8 min and the nitrile butadiene rubber is processed until the Mooney viscosity is preferably between 55 and 60;

step 2, adding ⅔ of the N220 carbon black weighed in parts by weight and ½ of the N774 carbon black weighed in parts by weight in the above sizing material for mixing, where the mixing temperature is controlled at 83 DEG C. and the time is about 8 min;

step 3, adding ⅓ of the N220 carbon black weighed in parts by weight, ½ of the N774 carbon black weighed in parts by weight and the DOA plasticizer weighed in parts by weight for mixing to obtain a master batch, where the mixing temperature is controlled at 83 DEG C. and the time is about 4 min;

step 4, filtering the master batch in a rubber filter, then placing it in an open mill, and then adding the S-80 vulcanizing agent and the DM vulcanizing agent which are weighed in parts by weight for mixing to obtain a rubber compound;

step 5, blending the rubber compound on a hot mill for improving the mixing uniformity of the sizing material and further increasing the plasticity; and step 6, placing the rubber compound in a calender to calender a rubber sheet, then placing it in an extruder to extrude a rubber sheet, and then discharging the rubber sheet and cooling it.

EXAMPLE 3

An example 3 of the present invention provides a sizing material for a hydraulic accumulator bladder, which is prepared from at least the following raw materials in parts by weight: 90 parts by weight of nitrile butadiene rubber, 50 parts by weight of polyvinyl chloride plastic, 5 parts by weight of zinc oxide, 1.5 parts by weight of stearic acid, 0.5 part by weight of paraffin, 3 parts by weight of an antioxidant, 40 parts by weight of N220 carbon black, 7.5 parts by weight of N774 carbon black, 22 parts by weight of a plasticizer, 1.8 parts by weight of a S-80 vulcanizing agent, and 1.2 parts by weight of a DM vulcanizing agent.

The sizing material for the hydraulic accumulator bladder provided by the example 3 of the present invention is prepared by adopting the following steps:

step 1, mixing the nitrile butadiene rubber, the polyvinyl chloride plastic, the zinc oxide, the stearic acid, the paraffin and the 4010NA antioxidant which are weighed in parts by weight in an internal mixer, where the mixing temperature is controlled at 77 DEG C., the time is about 8 min and the nitrile butadiene rubber is processed until the Mooney viscosity is preferably between 55 and 60;

step 2, adding ⅔ of the N220 carbon black weighed in parts by weight and ½ of the N774 carbon black weighed in parts by weight in the above sizing material for mixing, where the mixing temperature is controlled at 77 DEG C. and the time is about 8 min;

step 3, adding ⅓ of the N220 carbon black weighed in parts by weight, ½ of the N774 carbon black weighed in parts by weight and the DOA plasticizer weighed in parts by weight for mixing to obtain a master batch, where the mixing temperature is controlled at 77 DEG C. and the time is about 4 min;

step 4, filtering the master batch in a rubber filter, then placing it in an open mill, and then adding the S-80 vulcanizing agent and the DM vulcanizing agent which are weighed in parts by weight for mixing to obtain a rubber compound;

step 5, blending the rubber compound on a hot mill for improving the mixing uniformity of the sizing material and further increasing the plasticity; and step 6, placing the rubber compound in a calender to calender a rubber sheet, then placing it in an extruder to extrude a rubber sheet, and then discharging the rubber sheet and cooling it.

EXAMPLE 4

An example 4 of the present invention provides a sizing material for a hydraulic accumulator bladder, which is prepared from at least the following raw materials in parts by weight: 50 parts by weight of nitrile butadiene rubber, 10 parts by weight of polyvinyl chloride plastic, 3 parts by weight of zinc oxide, 1 part by weight of stearic acid, 1 part by weight of paraffin, 3 parts by weight of an antioxidant, 42.5 parts by weight of N220 carbon black, 7.5 parts by weight of N774 carbon black, 22 parts by weight of a plasticizer, 1.5 parts by weight of a S-80 vulcanizing agent, and 0.85 part by weight of a DM vulcanizing agent.

The sizing material for the hydraulic accumulator bladder provided by the example 4 of the present invention is prepared by adopting the following steps:

step 1, mixing the nitrile butadiene rubber, the polyvinyl chloride plastic, the zinc oxide, the stearic acid, the paraffin and the 4010NA antioxidant which are weighed in parts by weight in an internal mixer, where the mixing temperature is controlled at 85 DEG C., the time is about 7 min and the nitrile butadiene rubber is processed until the Mooney viscosity is preferably between 55 and 60;

step 2, adding ⅔ of the N220 carbon black weighed in parts by weight and ½ of the N774 carbon black weighed in parts by weight in the above sizing material for mixing, where the mixing temperature is controlled at 85 DEG C. and the time is about 7 min;

step 3, adding ⅓ of the N220 carbon black weighed in parts by weight, ½ of the N774 carbon black weighed in parts by weight and the DOA plasticizer for mixing to obtain a master batch, where the mixing temperature is controlled at 85 DEG C. and the time is about 6 min;

step 4, filtering the master batch in a rubber filter, then placing it in an open mill, and then adding the S-80 vulcanizing agent and the DM vulcanizing agent which are weighed in parts by weight for mixing to obtain a rubber compound;

step 5, blending the rubber compound on a hot mill for improving the mixing uniformity of the sizing material and further increasing the plasticity; and step 6, placing the rubber compound in a calender to calender a rubber sheet, then placing it in an extruder to extrude a rubber sheet, and then discharging the rubber sheet and cooling it.

By testing, technical performance indicators of the bladder manufactured by using the sizing material provided by the present invention are shown in Table 1.

TABLE 1

| No. | Item | Detection result |
|---|---|---|
| 1 | Hardness (Shore) | 36-38 |
| 2 | Tensile strength | ≥18 Mpa |
| 3 | Elongation at break | ≥500% |
| 4 | Permanent deformation rate under compression 70 DEG C./24 h | ≤15% |
| 5 | Hot-air aging 70 DEG C/120 h | |
| | Change rate of tensile strength | ≤±15% |
| | Change rate of elongation at break | ≤±15% |
| | Change rate of hardness (Shore) | ≤±3% |
| 6 | High-temperature aging 70 DEG C./120 h | |
| | Change rate of tensile strength | ≤±15% |
| | Change rate of elongation at break | ≤±15% |
| 7 | Tear strength (kN/m) | ≥115 |
| 8 | Change rate of oil-resistant volume 70 DEG C./120 h, No. 25 hydraulic oil | ≤30% |
| 9 | Detergent soaking resistance 70 DEG C./24 h, 1%-concentration detergent Change rate of tensile strength Change rate of elongation at break | Change rates after soaking all ≤30% no hardening and cracks occur |
| 10 | Low-temperature brittleness temperature resistance/DEG C. | ≥−65/DEG C. |

A rubber-plastic alloy bladder of the present invention adopts nitrile butadiene rubber as main base material, and a part of polyvinyl chloride is added as an effective material for modification. From a research perspective of a high-molecular material, a double bond on a long chain of the nitrile butadiene rubber is terminated by a polyvinyl chloride (PVC) macromolecule, such that the sizing material for the hydraulic accumulator bladder provided by the present invention has a highly saturated elastomer, good oil resistance (good resistance to fuel oil, lubricating oil and aromatic series solvents), and good heat resistance, excellent chemical corrosion resistance (good resistance to Freon, acid and alkali), excellent ozone resistance, higher anti-compression set performance because of its highly saturated structure, and also has characteristics of high strength, high tear resistance, excellent wear resistance and the like.

The sizing material for the hydraulic accumulator bladder provided by the present invention not only solves the technical problems of short service life and the like in the prior art, but also makes the content of polycyclic aromatic hydrocarbons (PAHs) in the bladder fully meet the European Union environmental protection requirements. The content of the PAHs is analyzed and detected by adopting a GC-MS method, and its result does not exceed 0.5 mg/kg, which fully meets the European Union environmental protection requirements. High elasticity and tightness of the sizing material in thick oil and concentrated solvents are not changed for a long time. The sizing material is hard to age in long-term work under a high-temperature and high-pressure environment, maintains high elasticity of the bladder, and prolongs its service life.

Basic principles, main features, and advantages of the present invention have been shown and described above. It should be understood by those skilled in the art that the present invention is not limited by the foregoing examples. The foregoing examples and the description describe only the principles of the present invention, and there will be various changes and improvements in the present invention without departing from the spirit and scope of the present invention. These changes and improvements are within a protective scope of the present invention. The protective scope of the present invention is defined by the appended claims and their equivalents.

INDUSTRIAL APPLICABILITY

Compared with the prior art, the bladder manufactured by the method for manufacturing the hydraulic accumulator bladder provided in this disclosure is integrally formed by one-step vulcanization, and has the advantages of uniform wall thickness, smooth inner and outer surfaces, long fatigue lifetime, a simplified process, high product quality, and good stability. The bladder is excellent in gas sealing performance, may effectively prevent the gas in a bladder body from leaking, and can eliminate a peak-valley value of the pressure fluctuation. The bladder is very high in industrial applicability and operability, and can be industrially realized.

We claim:

1. A method for manufacturing a hydraulic accumulator bladder, comprising:
   a. preparation of a sizing material;
   mixing a nitrile butadiene rubber, a polyvinyl chloride plastic, a zinc oxide, a stearic acid, a paraffin and an antioxidant in an internal mixer under a mixing temperature of 80° C. for 6 minutes until a Mooney viscosity of the nitrile butadiene rubber is between 55 and 60;
   adding a N220 carbon black and a N774 carbon black into the mixer under a mixing temperature of 80° C. for 6 minutes;
   adding the N220 carbon black, the N774 carbon black and a DOA plasticizer into the mixer and mixing under a temperature of 80° C. for 6 minutes to obtain a master batch;
   filtering the master batch in a rubber filter, placing it in an open mill, adding a S-80 vulcanizing agent and a DM vulcanizing agent and mixing to obtain a rubber compound;
   blending the rubber compound on a hot mill;
   calendering the blended rubber compound in a calender, extruding the calendered rubber compound in an extruder, discharging the extruded rubber compound and cooling to obtain the sizing material;
   b. preheating the sizing material in a rubber baking room of 60° C. to 70° C. for 3 to 8 hours; and
   c. winding the sizing material around a gas-filled air bladder to form a bladder blank.
   d. placing the bladder blank in a vulcanization device for vulcanization to form an initial bladder product; and
   e. releasing the gas in the gas-filled air bladder of the initial bladder product, taking the air bladder out, and cooling the initial bladder product to a room temperature to obtain the hydraulic accumulator bladder.

* * * * *